United States Patent
Tantot et al.

(10) Patent No.: US 11,136,937 B2
(45) Date of Patent: Oct. 5, 2021

(54) AIRCRAFT PROPULSION ASSEMBLY COMPRISING A THRUST REVERSER

(71) Applicant: SAFRAN AIRCRAFT ENGINES, Paris (FR)

(72) Inventors: Nicolas Jérôme Jean Tantot, Moissy-Cramayel (FR); Antoine Jean-Philippe Beaujard, Moissy-Cramayel (FR); Pascal Coat, Moissy-Cramayel (FR); Didier Jean-Louis Yvon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 297 days.

(21) Appl. No.: 15/745,682

(22) PCT Filed: Jul. 21, 2016

(86) PCT No.: PCT/FR2016/051884
§ 371 (c)(1),
(2) Date: Jan. 17, 2018

(87) PCT Pub. No.: WO2017/013362
PCT Pub. Date: Jan. 26, 2017

(65) Prior Publication Data
US 2018/0209378 A1 Jul. 26, 2018

(30) Foreign Application Priority Data
Jul. 22, 2015 (FR) ...................................... 1556958

(51) Int. Cl.
*F02K 1/70* (2006.01)
*F02K 1/60* (2006.01)
(Continued)

(52) U.S. Cl.
CPC ............... *F02K 1/70* (2013.01); *F01D 13/02* (2013.01); *F02C 3/10* (2013.01); *F02C 6/02* (2013.01);
(Continued)

(58) Field of Classification Search
CPC ..... F02K 1/70; F02K 1/72; F02K 1/60; F02K 1/605; F02K 1/62; F02K 1/625;
(Continued)

(56) References Cited

U.S. PATENT DOCUMENTS 2,696,079 A 12/1954 Kappus
3,194,516 A * 7/1965 Messerschmitt ....... B64D 27/20
244/74

(Continued)

FOREIGN PATENT DOCUMENTS

FR 2997681 A1 5/2014
WO 2014/092757 A1 6/2014
WO 2014/193515 A2 12/2014

OTHER PUBLICATIONS

International Search Report dated Nov. 9, 2016, issued in corresponding International Application No. PCT/FR2016/051884, filed Jul. 21, 2016, 3 pages.

(Continued)

Primary Examiner — Andrew H Nguyen
(74) Attorney, Agent, or Firm — Christensen O'Connor Johnson Kindness PLLC

(57) ABSTRACT

An aircraft propulsion assembly, including a turbine engine comprising at least one gas generator configured to generate a main flow, which is supplied by a central jet to at least one power turbine, the central jet being surrounded by an outer fairing, and the power turbine driving, on the periphery thereof, at least one fan rotor. The aircraft propulsion assembly comprises first movable means which are arranged so as
(Continued)

to divert at least some of the main flow from the central jet to the outside of the outer fairing and preferably upstream of the turbine engine so as to generate thrust reversal. An aircraft which uses the propulsion assembly, particularly on the rear tip of the fuselage of the aircraft.

15 Claims, 2 Drawing Sheets

(51) Int. Cl.
    *F02C 3/10*     (2006.01)
    *F01D 13/02*    (2006.01)
    *F02K 3/06*     (2006.01)
    *F02K 3/072*    (2006.01)
    *F02C 6/02*     (2006.01)
    *F02K 1/74*     (2006.01)
    *F02K 1/76*     (2006.01)

(52) U.S. Cl.
    CPC ............... *F02K 1/60* (2013.01); *F02K 1/74* (2013.01); *F02K 1/763* (2013.01); *F02K 1/766* (2013.01); *F02K 3/06* (2013.01); *F02K 3/072* (2013.01)

(58) Field of Classification Search
    CPC .......... F02K 1/74; F02K 3/062; F02K 3/077; F02C 3/10; F02C 6/00
    See application file for complete search history.

(56) References Cited

U.S. PATENT DOCUMENTS

| 3,366,350 | A | * | 1/1968 | Hoffert | ............. F02K 3/12 244/55 |
| 3,517,898 | A | | 6/1970 | Laville et al. | |
| 4,149,374 | A | | 4/1979 | Barchenko | |
| 2009/0145133 | A1 | * | 6/2009 | Murphy | ............. F02K 1/82 60/770 |
| 2010/0139278 | A1 | * | 6/2010 | Clemen | ............. F01D 5/08 60/689 |
| 2014/0053533 | A1 | | 2/2014 | Suciu et al. | |
| 2015/0291285 | A1 | | 10/2015 | Gallet | |

OTHER PUBLICATIONS

Written Opinion of the International Searching Authority dated Nov. 9, 2016, issued in corresponding International Application No. PCT/FR2016/051884, filed Jul. 21, 2016, 6 pages.

International Preliminary Report on Patentability dated Jan. 23, 2018, issued in corresponding International Application No. PCT/FR2016/051884, filed Jul. 21, 2016, 1 page.

* cited by examiner

AIRCRAFT PROPULSION ASSEMBLY COMPRISING A THRUST REVERSER

FIELD OF THE INVENTION AND PRIOR ART

The present invention relates in particular to the field of turbine engines for aircraft such as aeroplanes, particularly civilian aeroplanes, that have contra-rotating fans positioned downstream of the gas generator portion that drives the turbine portion coupled to the fans. More specifically, the invention relates to means for reversing thrust and producing aerodynamic braking for this type of turbine engine.

The type of turbine engine in question is found, for example, in an aircraft architecture proposed in the patent application FR-A1-2 997 681. In this case, the turbine engine is incorporated in the extension of the fuselage downstream of said fuselage, in order to reduce noise pollution and the fuel consumption of the aircraft by reducing the aerodynamic drag through absorption of the boundary layer.

In an architecture of this kind, the aircraft is propelled by a turbine engine having contra-rotating ducted fans, the turbine engine being incorporated at the rear of the aircraft fuselage, in the extension thereof, and comprising two gas generators that feed a power turbine having two contra-rotating rotors in order to drive two fans that are arranged downstream of the gas generators and powered by an annular ring gear, and distinct lateral air intakes for feeding each gas generator. The annular ring gear for powering the fans is arranged so as to absorb at least part of the boundary layer formed around the aircraft fuselage. In this case, the diameter of the nacelle of the fans is substantially the same as that of the largest cross section of the aircraft fuselage and surrounds the power turbine.

Like with other types of aircraft, there is a need to provide an aircraft fitted with a system for reversing the thrust of the turbine engine. Taking into account the arrangement of the nacelle around the fans at the tail of the aircraft, it is difficult to fit this nacelle with movable devices that make it possible, in a known manner, to either modify the outlet cross section or drive back the air exiting the fans. Indeed, there is no structure close to this area that could absorb the forces generated on the nacelle. Turbine engines equipped with a thrust reversal system are known from US 2014/053533, WO 2014/193515 and WO 2014/092757.

The object of the present invention is to provide a solution capable of reversing, in a simple manner, the thrust of a turbine engine of which the fan(s) is/are located downstream of the gas generator, in particular in an aircraft architecture described above.

DESCRIPTION OF THE INVENTION

To this end, the invention relates to an aircraft propulsion unit comprising a turbine engine having at least one gas generator designed to generate a primary flow, at least one power turbine, a central duct that feeds the power turbine with the primary flow, said central duct being surrounded by an external fairing and said power turbine driving, at its periphery, at least one fan rotor, and first movable means arranged so as to divert at least part of the primary flow to the outside of said external fairing and upstream of the turbine engine in order to generate thrust reversal, the central duct being upstream of the power turbine and the first movable means being arranged upstream of the power turbine.

In the present application, external fairing is understood to mean a propulsion unit cowling arranged such that an air flow outside at least one portion of the propulsion unit sweeps along it, in particular an air flow flowing around the central duct. The fan rotors are generally positioned within the extension of said external cowling, in such a way that the external air flow sweeping along the external fairing enters said fans.

By diverting the primary flow upstream, said first movable means produce thrust reversal, linked to the change in direction of said flow. In addition, since said first movable means are upstream of the power turbine, they can stop the supply to the turbine when they divert the primary flow. The thrust of the turbine engine, resulting from the fan rotors, can thus be eliminated in this case.

According to a feature of the invention, the cross section of the central duct is circular.

Advantageously, the first movable means comprise at least two inner doors designed to pivot between a first position, in which they form walls of said central duct, and a second position, in which they block at least part of the central duct and divert at least part of the primary flow towards the external fairing. This makes it possible to both divert the primary flow and prevent the supply to the propulsion assembly.

Preferably, said unit also comprises second movable means arranged so as to block at least part of a flow passing around said external fairing towards said at least one fan rotor.

Advantageously, the second movable means comprise at least two outer doors designed to pivot between a first position, in which they form part of said external cowling, and a second position, in which an upstream edge of said outer doors moves away from the external fairing in order to block at least part of said flow passing through. This configuration makes it possible to divert the secondary flow. This configuration also makes it possible to block the supply to the propulsion assembly.

More preferably, when the outer doors are in their second position, the upstream edge thereof extends radially at least up to substantially the external periphery of said at least one fan rotor, in relation to a rotational axis of said rotor.

Taking into account the fact that the radius of a turbojet engine fan rotor is usually large, the means able to block at least part of the flow entering the fan rotor provide a large surface area counter to the incident flow and thus form effective air brakes.

Advantageously, the inner doors and the outer doors are arranged such that, when they are all in their second position, they provide a passage from the central duct to the outside of the external fairing for the portion of the primary flow diverted by the inner doors.

According to an aspect of the invention, a device links the movement of each inner door to that of at least one outer door and is arranged such that the first and second positions of one door correspond to the first and second positions of the other, respectively.

In particular, this device makes it possible to actuate two doors using just one actuator, for example.

Advantageously, the secondary flow is not externally ducted in the region of the primary flow central duct.

Advantageously, the primary and secondary flows are oriented in the same direction.

The invention also relates to an aircraft comprising a propulsion unit of this kind.

Preferably, it is an aircraft that comprises a fuselage and is propelled by a unit as described above, at least one portion of the fuselage forming said external fairing and said turbine engine comprising two coaxial fan rotors, one upstream and one downstream, that are driven by two contra-rotating rotors of the power turbine, the two fan propellers and the turbine being incorporated in a nacelle downstream of the fuselage, in the extension of the fuselage.

Within said aircraft, air intakes of the one or more gas generators advantageously have internal walls directly incorporated in the fuselage.

BRIEF DESCRIPTION OF THE FIGURES

The present invention will be better understood, and other details, features and advantages of the present invention will become clearer on reading the following description of a non-limiting example, given with reference to the accompanying drawings, in which.

DESCRIPTION OF AN EMBODIMENT

Figure 1:
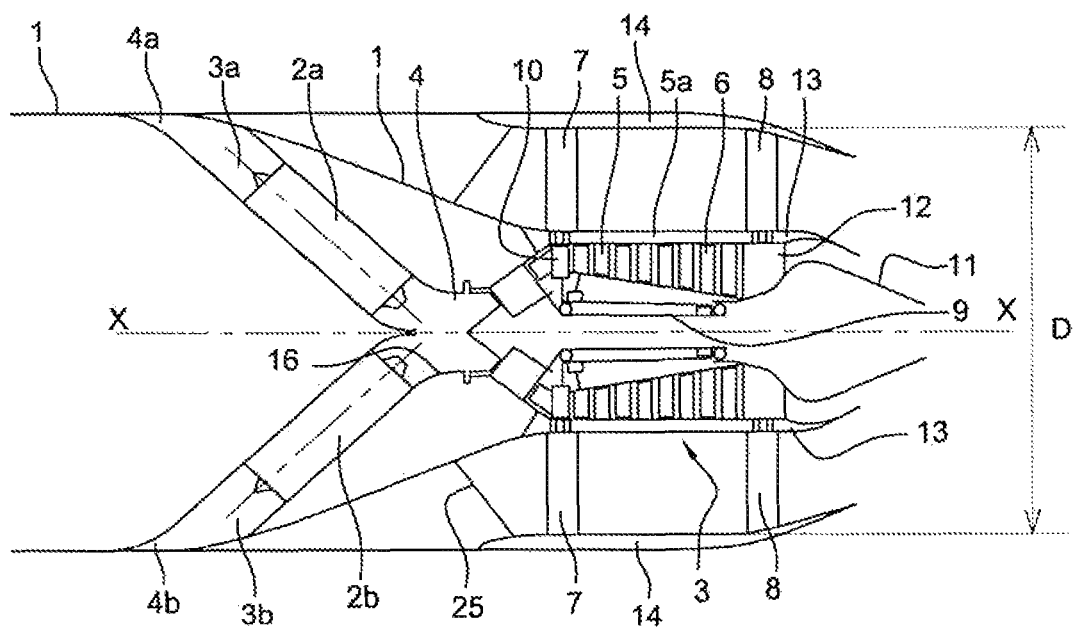
FIG. 1 is a schematic longitudinal section through the rear portion of an aircraft fitted with a turbine engine according to the invention.

The invention applies in particular to an aircraft, such as an aeroplane, comprising a turbine engine of the type shown in FIG. 1.

As shown in FIG. 1, the turbine engine is centred on the longitudinal axis XX of the aircraft fuselage 1. From upstream to downstream in the gas flow direction, this turbine engine comprises two separate gas generators 2a, 2b that simultaneously feed a single power turbine 3. The turbine engine is arranged at the downstream end of the aircraft fuselage 1.

In this document, the terms axial and radial refer to the axis XX of the fuselage and turbine engine. Likewise, the terms upstream and downstream refer to the main flow direction along this axis.

As is known per se, each gas generator 2a, 2b comprises at least one compressor, a combustion chamber and at least one turbine (none shown in the figures).

Each gas generator 2a, 2b is housed within a primary flow duct 3a, 3b. Distinct air intakes 4a, 4b are provided for these ducts 3a, 3b in order to feed each gas generator 2a, 2b. In the example shown, the air intakes 4a, 4b are connected to the aircraft fuselage 1, upstream of the gas generators 2a, 2b, and the internal wall of said intakes is directly incorporated in the fuselage 1. The intakes thus absorb some of the boundary layer formed around the aircraft fuselage 1. In a different configuration (not shown), however, the lateral air intakes feeding each gas generator can be at a distance from the aircraft fuselage 1, in such a way as to minimise absorption of the boundary layer and aid the operation of the gas generators. It is also conceivable to use more than two gas generators, for example three, to feed the power turbine 3.

Preferably, the two primary flow ducts 3a, 3b of the gas generators 2a, 2b converge along the longitudinal axis XX and between them form a V that is open in the upstream direction and the opening angle of which is preferably between 80° and 120°.

The two primary flow ducts 3a, 3b of the gas generators 2a, 2b converge into a central primary duct 4 that feeds the power turbine 3. In other words, the power turbine 3 is fed by the primary flow of the gas generator exiting the central duct 4. The central duct 4 is arranged upstream of the power turbine. A mixer (not shown in the drawings) is preferably positioned in the region where the two ducts 3a, 3b converge, these ducts housing the gas generators 2a, 2b. The purpose of this mixer is to mix the gas flows from the gas generators 2a, 2b in order to produce a single, uniform gas flow exiting the primary central duct 4.

The power turbine 3, which is fed by this primary flow exiting the central duct 4, is equipped with two contra-rotating turbine rotors 5, 6 for driving two fan rotors 7, 8 in a contra-rotating manner. These turbine rotors 5, 6 are coaxial and centred on the longitudinal axis XX. They rotate around an internal casing 9 secured to the aircraft structure. It is understood that said doors 15 are mounted upstream of the power turbine 3.

In this case, a first turbine rotor 5 corresponds to blades connected to a tubular body 5a that separates the primary flow duct, within the power turbine 3, from the secondary flow duct, in which the fan rotors 7, 8 are located. The blades and the tubular body 5a of the first rotor 5 are connected to the supporting bearings for supporting the rotor 5 on the internal casing 9 by means of support arms 10 that cross the primary duct upstream of the power turbine 3.

In the same example, the second rotor 6 corresponds to blades that are connected to a radially internal wall of the primary duct within the turbine 3 and placed longitudinally between the blades of the first rotor 5.

Downstream of the power turbine 3, the radially internal portion of the second rotor 6 is extended by a central body 11. The portion is connected, by support arms 12, to a ring 13 for supporting the blades of the downstream fan rotor 8. In addition, this ring 13 extends the tubular body 5a of the first rotor 5 and comprises an extension towards the rear, so as to form, together with the central body 11, a primary exhaust nozzle at the outlet of the power turbine 3.

In the example shown, a first, upstream fan rotor 7 is positioned at the intake of the power turbine 3. The rotor is connected to the first rotor 5 of the turbine 3 at the arms 10 that support the cylindrical external body 5a upstream. This upstream fan rotor 7 thus rotates at the same speed as the first rotor 5 of the power turbine 3.

In the same example, the second, downstream fan rotor 8 is positioned at the outlet of the power turbine 3. The rotor is connected to the second rotor 6 of the turbine 3 in the region of the support ring 13 and the arms 12 supporting said ring. This downstream fan rotor 8 thus rotates at the same speed as the second rotor 6 of the power turbine 3.

The two fans 7, 8 are ducted by a nacelle 14 secured to the aircraft structure. This nacelle 14 can be secured, for example, to the aircraft tail unit (not shown in the drawings). The external diameter D of the fans is similar to the greatest external diameter of the aircraft fuselage 1.

Since the air entering the fans 7, 8 consists in part of the boundary layer of the aircraft fuselage, the intake speed is low compared with conventional turbine engine fans, and the output speed is likewise lower under identical compression conditions; this improves the propulsive and acoustic performance of these fans. In addition, the large external diameter D of the fans 7, 8 drive only their rotational speed, like that of the rotors 5, 6 of the power turbine 3, is also low compared with a conventional turbine engine, in particular so that the blade head speed is subsonic.

Figure 2:
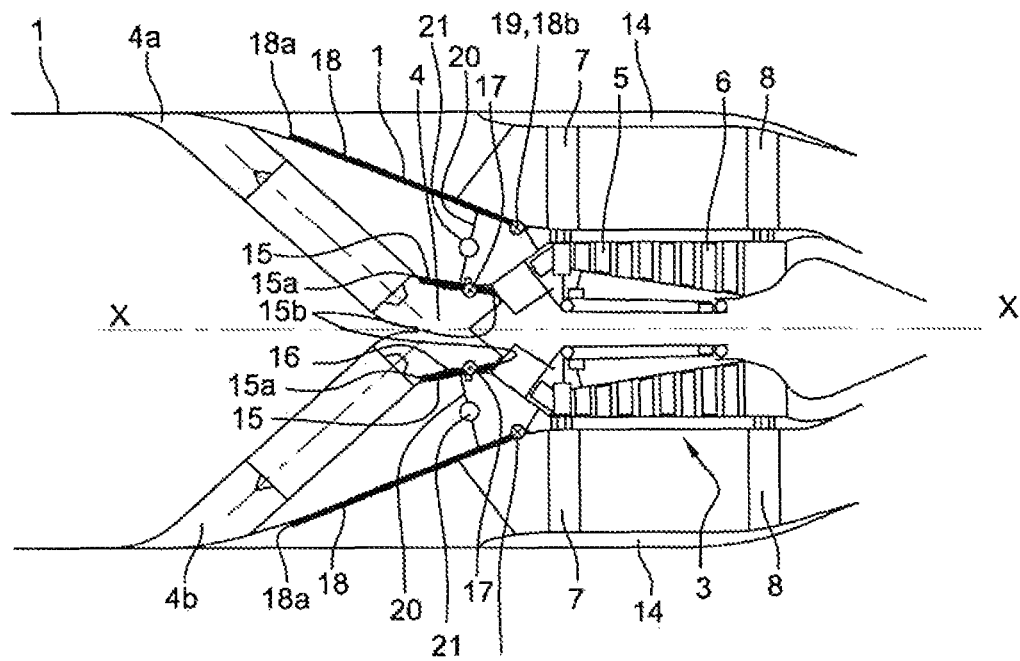
FIG. 2 is a schematic view based on the unit from FIG. 1, showing the thrust reversal means according to the invention in retracted mode.
Figure 3:
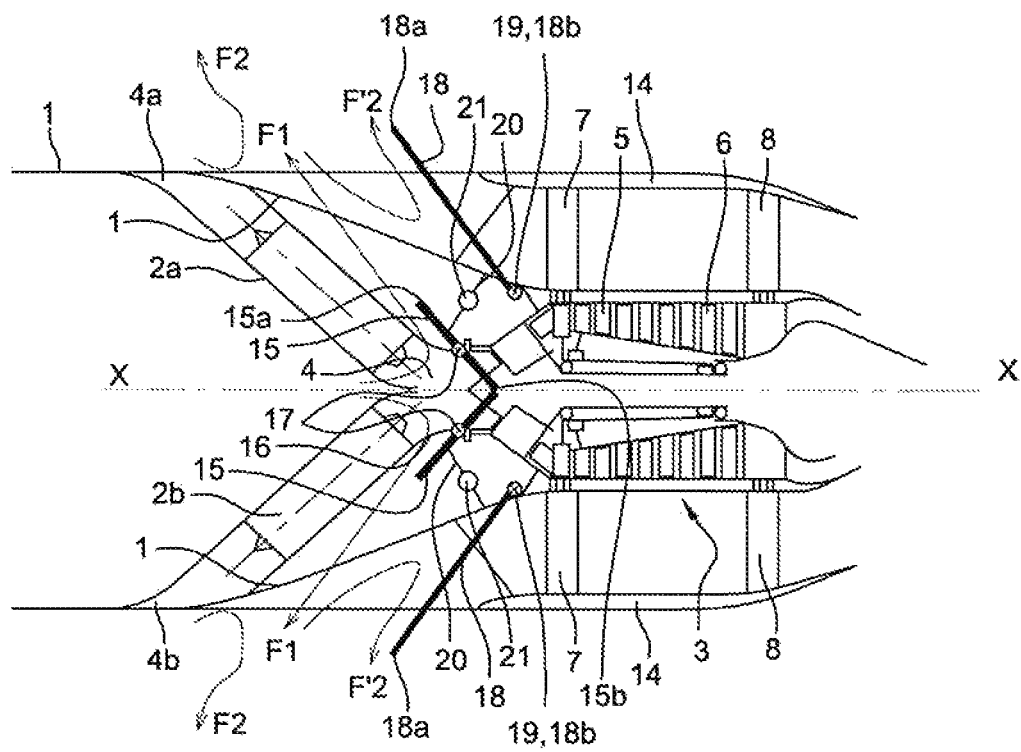
FIG. 3 is a schematic view based on the unit from FIG. 1, showing the thrust reversal means according to the invention in opened out mode.

According to an aspect of the invention, since the central duct has a substantially circular cross section around the axis XX, the wall thereof is formed by a fixe structure 16, for example a central casing 16 that is connected to the aeroplane structure and comprises pivoting inner doors 15. In FIG. 2, these inner doors 15 are in a first, retracted position, in which they form portions of the wall of the primary central duct 4, together with the central casing 16. In this position, the inner doors 15 form a cut-out in the duct wall, which cut-out is elongate along the axis XX and has a substantially constant width. In particular, each inner door 15 has an upstream edge 15a and a downstream edge 15b that are, in the continuation of the wall formed by the casing 16, upstream and downstream of the door 15. In FIG. 3, the inner doors 15 are in a second, opened-out position, in which their downstream edges 15b are closer to the axis XX, the upstream edges 15a being radially further away from this axis XX. To move from one position to the other, each inner door 15 is pivotally mounted about an axis 17 which is perpendicular to the axis XX and located in a substantially intermediate position between the upstream edges 15a and downstream edges 15b of said door 15.

The geometry of the inner doors 15 and the position of the pivot axes 17 are such that, when the inner doors 15 are in the opened-out position, their downstream edges 15b come together so as to prevent at least part of the primary flow from passing through downstream. Under these conditions, the primary flow is partly driven back upstream, following the tilt of the opened-out inner doors 15 in relation to the axis XX and passes through the opening in the wall of the primary central duct 4 made by the doors 15 being opened out. The primary flow is diverted radially towards the outside and upstream, as shown by the arrows F1 in FIG. 3. This makes it possible to generate negative thrust by reversing the primary flow, which is capable of braking the aeroplane.

In addition, the rotors 5, 6 of the power turbine are no longer being driven. The fan rotors 7, 8 thus stop propelling the secondary flow entering the nacelle 4.

In the present invention, the primary and secondary flows pass through the turbine engine from upstream to downstream. In other words, the primary and secondary flows flow in the same direction.

There can, for example, be two pivoting inner doors 15, produced according to a technique used for thrust reversal at the outlet of an exhaust nozzle for a mixed-flow turbojet engine and examples of which are described in FR-B1-2957634 or FR-A1-2764000.

Figure 4:
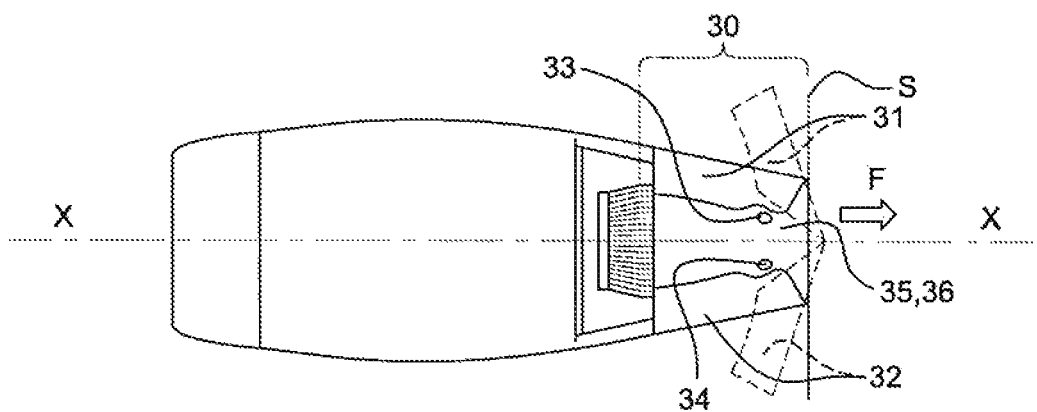
FIG. 4 is a schematic side view of a turbine engine fitted with a thrust reverser according to the prior art.

With reference to FIG. 4, in these examples the outlet nozzle 30 of the turbojet engine has a substantially circular cross section around the axis XX of the turbojet engine. The nozzle 30 is shown as being convergent, but the shapes can also be adjusted to other variations in the duct cross section. The thrust reversal system occupies the downstream portion of the nozzle 30 up to the edge of its outlet cross section S. An upper door 31 and a lower door 32 are pivotally mounted on horizontal axes 33, 34. These axes are held by lateral beams 35, 36 (one of the lateral beams is not visible in the figure), which form the wall of the nozzle 30 together with the doors 31, 32, when these are in the retracted position. FR-B1-2957634 and FR-A1-2764000 provide example geometric arrangements for the cut-out in the pivoting doors 33, 34 in relation to the beams 35, 36, as well as possible devices at the downstream edges for ensuring that these doors 33, 34 close off the downstream passage for the gas flow exiting the nozzle 30 when the doors are in the opened-out position (indicated in dotted lines in FIG. 4).

The aforementioned examples should be taken as merely illustrative. The implementation of the invention may equally involve more than two pivoting doors. A person skilled in the art is capable of adjusting the geometries for closing off the downstream passage for the primary flow and diverting it upstream.

In an aircraft to which the invention relates, the shape of the primary central duct 4 does not generally follow the shape of the fuselage 1. In addition, the fuselage 1 is generally radially remote from the primary central duct 4.

A first solution may be to provide the fuselage 1, along the path of the diverted primary flow F1, with grids that can open when the inner doors 15 are opened out.

Preferably, and in accordance with a second aspect of the invention, the fuselage 1 also comprises pivoting outer doors 18. With reference to FIG. 2, these outer doors 18 have a first, retracted position, in which they form the continuation of the fuselage 1 in order to guide the secondary flow (in this case the external air flow along the length of the fuselage 1) towards the fan rotors 7, 8. When in this position, the outer doors 18 form a cut-out in the fuselage 1, which cut-out may have a shape that is substantially parallelepiped and elongate along the axis XX. In particular, each outer door 18 has an upstream edge 18a and a downstream edge 18b that are, in the continuation of the wall formed by the casing 16, upstream and downstream of the doors 15. With reference to FIG. 3, each outer door 18 can be moved into an opened-out position by pivoting about an axis 19 that is perpendicular to the axis XX and located substantially close to the downstream edge 18b of said door 18. When in this opened-out position, the downstream edge 18b thus remains substantially in the region of the fuselage 1, whereas the upstream edge 18a moves considerably away from this axis XX radially outwards.

Advantageously, the openings made in the fuselage 1 when the outer doors 18 are opened out leave a free passage for the primary flow F1 diverted by the inner doors 15 when they are in the opened-out position. By exiting radially outwards, the primary flow F1 diverts a first portion F2 of the air flow running along the length of the fuselage 1. It is understood that the doors 18 are arranged upstream of the fans 7, 8. In particular, these doors 18 are arranged upstream of a plane that is perpendicular to the axis XX and is arranged upstream of the power turbine 3.

Moreover, the openings in the fuselage 1 stop downstream of the air intakes 4a, 4b of the gas generators 2a, 2b in order to rule out any risk of the diverted hot gases being reingested into the gas generators 2a, 2b. In addition, the shape of the passage for the diverted primary air flow F1 between the central duct 4 and the fuselage 1 is such that the diverted primary air flow F1 does not prevent the gas generators 2a, 2b being fed through said air intakes 4a, 4b.

Preferably, since the upstream edge 18a of each outer door 18 is located relatively far upstream in order to allow the diverted primary air flow F1 to pass through, the downstream edge 18b of said doors is located close to the first fan rotor 7. The extension obtained for the outer door 18 is such that, when the door is in the opened-out position, its upstream edge 18a extends radially beyond the nacelle 4. In this way, the outer doors 18 can at least largely prevent the secondary flow from passing through towards the fan rotors 7, 8. When in this position, the outer doors 18 form air brakes, which divert a portion F'2 of the external air that is not stopped by the diverted primary flow F1 and prevent the fan rotors 7, 8 from being driven. They thus contribute to braking the aeroplane.

In one embodiment, it is possible to use the same number of outer doors 18 as inner doors 15, coordinating their positions to provide the passage for the primary flow F1 diverted by means of the fuselage 1. It is also possible to provide a greater number of outer doors 18 in order to more effectively divide the opening thereof into sectors, taking into account their longitudinal extension.

Pivoting doors divided into sectors on the fuselage 1 can be produced according to known technologies, FR-B1-2706536 disclosing an embodiment of doors of this kind within an intermediate casing or nacelle.

When the number of inner doors 15 and outer doors 18 is the same, they match each other in pairs so as to allow the diverted primary flow F1 to pass through. In this case, and in accordance with another aspect of the invention, a rigid structure capable of transmitting longitudinal forces, for example a connecting rod 20, is mounted in the manner of a ball joint between an inner door 15 and the corresponding outer door 18. This makes it possible to coordinate the rotational movement of the inner door 15 about the axis 17, as described above, with the rotational movement of the corresponding outer door 18 about the axis 19 so that they open out at the same time, in order to allow the diverted primary flow F1 to flow through freely. Preferably, the rotational axes are tangential to their respective doors.

Preferably, said connecting rod 20 is connected to an actuator 21 secured to the aeroplane structure between the fuselage 1 and the primary central duct 4. Just one actuator 21 is thus required to actuate the two doors. In addition, the entire mechanism can be positioned within a normally relatively empty volume inside the fuselage 1, between the gas generators 2a, 2b and the power turbine 3.

The invention has been described on the basis of the preference for a turbine engine incorporated at the rear end of an aeroplane fuselage. However, the invention can be used more generally when the turbojet engine comprises the fan downstream of the gas generator, the power turbine being connected to said generator by means of a primary central duct. The inner and outer pivoting doors can thus be supported by an intermediate casing that forms the walls of the central duct and the radially internal walls of the flow entering the fan rotor.

The invention claimed is:

1. An aircraft propulsion unit comprising a turbine engine, said turbine engine comprising:
at least two gas generators, each of the at least two gas generators is housed in a respective primary flow duct and designed to each generate a primary flow;
at least one power turbine driving at least one fan rotor having a longitudinal axis and located at a periphery of said at least one power turbine, each of the at least two gas generators comprising a compressor, a combustion chamber and at least one turbine;
a central duct arranged upstream of the at least one power turbine with regard to the longitudinal axis,
each of the primary flow ducts converging into said central duct to feed the at least one power turbine with the primary flow from each gas generator, said central duct being surrounded by an external fairing; and
first movable members arranged so as to divert at least part of each of the primary flows to the outside of said external fairing and upstream of the turbine engine in order to generate thrust reversal,
the first movable members being arranged in the central duct upstream of the at least one power turbine with regard to the longitudinal axis.

2. The propulsion unit according to claim 1, wherein the first movable members comprise at least two inner doors designed to pivot between a first position, in which they form walls of said central duct, and a second position, in which they block at least part of the central duct and divert at least part of each of the primary flows towards the external fairing.

3. The propulsion unit according to claim 1, further comprising second movable members arranged so as to block at least part of a flow passing around said external fairing towards said at least one fan rotor.

4. The unit according to claim 3, wherein the second movable members comprise at least two outer doors designed to pivot between a first position, in which they form part of said external fairing, and a second position, in which an upstream edge of said at least two outer doors moves away from the external fairing in order to block at least part of said flow.

5. The propulsion unit according to claim 4, wherein, when said at least two outer doors are in their second position, the upstream edge thereof extends radially at least up to substantially an external periphery of said at least one fan rotor in relation to a rotational axis of a fan.

6. The propulsion unit according to claim 4, wherein the first movable members comprise at least two inner doors designed to pivot between a first position, in which they form walls of said central duct, and a second position, in which they block at least part of the central duct and divert at least part of each of the primary flows towards the external fairing; and wherein
the at least two inner doors and the at least two outer doors are arranged such that, when they are all in their second position, they provide a passage from the central duct to the outside of the external fairing for the at least part of each of the primary flows diverted by the at least two inner doors.

7. The propulsion unit according to claim 6, comprising a link operating the movement of each inner door of said at least two inner doors to that of a respective outer door of said at least two outer doors and is arranged such that the first and the second positions of each inner door of said at least two inner doors correspond to the first and the second positions of the respectively linked outer door of said at least two outer doors.

8. An aircraft comprising a propulsion unit according to claim 1.

9. An aircraft that comprises a fuselage and is propelled by a propulsion unit according to claim 1, at least one portion of said fuselage forming said external fairing, and wherein said at least one fan rotor comprises upstream and downstream coaxial fan rotors, that are driven by two contra-rotating rotors of the at least one power turbine, the upstream and downstream coaxial fan rotors and the at least one power turbine being incorporated in a nacelle downstream of the fuselage, in the extension of the fuselage.

10. The aircraft according to claim 9, wherein air intakes of one of said at least two gas generators or said at least two generators have internal walls directly incorporated in the fuselage.

11. The aircraft propulsion unit according to claim 1, wherein the at least one power turbine mechanically drives the at least one fan rotor.

12. The aircraft propulsion unit according to claim 1, wherein the central duct has an air intake linked to an air outlet of each of the primary flow ducts.

13. The aircraft propulsion unit according to claim 1, wherein the at least one fan rotor extends radially outside an internal body, the internal body surrounding the at least one power turbine.

14. The aircraft propulsion unit according to claim 1, wherein the internal body extends the external fairing.

15. An aircraft propulsion unit comprising a turbine engine, said turbine engine comprising:
   at least two gas generators, each of the at least two gas generators is housed in a respective primary flow duct and designed to each generate a primary flow;
   at least one power turbine driving at least one fan rotor having a longitudinal axis, said at least one power turbine comprising two contra-rotating rotors, at least one of the two contra-rotating rotors is surrounded by an internal body and said at least one fan rotor is arranged in a secondary flow duct,
   each of the at least two gas generators comprising a compressor, a combustion chamber and at least one turbine;
   a central duct arranged upstream of the at least one power turbine with regard to the longitudinal axis, each of the primary flow ducts converging into said central duct to form a single uniform gas flow which feeds the at least one power turbine with each of the primary flows,
   said central duct being surrounded by an external fairing formed by a portion of a fuselage and arranged to guide at least a secondary flow inside the secondary flow duct;
   said internal body guiding at least the single uniform gas flow inside the power turbine; and
   first movable means arranged so as to divert at least part of each of the primary flows to the outside of said external fairing and upstream of the turbine engine in order to generate thrust reversal,
   the first movable means being arranged upstream of the at least one power turbine with regard to the longitudinal axis,
   wherein the first movable means comprise at least two inner doors designed to pivot between a first position, in which they form walls of said central duct, and a second position, in which they block at least part of the central duct and divert at least part of each of the primary flows towards the external fairing.

* * * * *